United States Patent
Mitchell

(10) Patent No.: US 9,381,527 B2
(45) Date of Patent: Jul. 5, 2016

(54) LIQUID DELIVERY APPARATUS

(76) Inventor: David Mitchell, Norfolk (GB)

(*) Notice: Subject to any disclaimer, the term of this patent is extended or adjusted under 35 U.S.C. 154(b) by 872 days.

(21) Appl. No.: 13/591,506

(22) Filed: Aug. 22, 2012

(65) Prior Publication Data

US 2013/0270360 A1  Oct. 17, 2013

(30) Foreign Application Priority Data

Apr. 13, 2012 (GB) .................................. 1206561.1

(51) Int. Cl.
| | |
|---|---|
| *B05B 3/16* | (2006.01) |
| *B05B 1/08* | (2006.01) |
| *B05B 1/30* | (2006.01) |
| *B05B 3/04* | (2006.01) |
| *B05B 12/06* | (2006.01) |
| *B05B 12/08* | (2006.01) |
| *A01C 23/04* | (2006.01) |

(52) U.S. Cl.
CPC ................. *B05B 1/086* (2013.01); *A01C 23/04* (2013.01); *B05B 1/304* (2013.01); *B05B 3/04* (2013.01); *B05B 12/06* (2013.01); *B05B 12/08* (2013.01); *B05B 3/16* (2013.01); *Y10T 74/18056* (2015.01)

(58) Field of Classification Search
CPC .......... B05B 1/086; B05B 1/304; B05B 3/04; B05B 12/06; B05B 12/08; B05B 3/16; A01C 23/04; Y10T 74/18056
USPC ............... 239/146, 239, 227, 228, 229; 74/25
See application file for complete search history.

(56) References Cited

U.S. PATENT DOCUMENTS

| | | | | |
|---|---|---|---|---|
| 1,984,531 | A | * | 12/1934 | Kind ....................... B05B 1/083 239/99 |
| 1,998,592 | A | | 4/1935 | Schenk et al. |
| 3,141,384 | A | * | 7/1964 | Hoffman ................... F01B 9/08 91/178 |
| 3,556,407 | A | * | 1/1971 | Iwajiro Niikura ........ B05B 3/02 239/227 |
| 3,818,928 | A | | 6/1974 | Carsten |

(Continued)

FOREIGN PATENT DOCUMENTS

| | | |
|---|---|---|
| DE | 605265 | 11/1934 |
| DE | 1044496 | 11/1958 |

(Continued)

OTHER PUBLICATIONS

Patents Act 1977: Search Report under Section 17(5), Application No. GB1206561.1, Dated Jul. 26, 2012.

(Continued)

*Primary Examiner* — Len Tran
*Assistant Examiner* — Joel Zhou
(74) *Attorney, Agent, or Firm* — MacMillan, Sobanski & Todd, LLC

(57) ABSTRACT

A liquid delivery apparatus includes a base assembly; a vessel into which liquid may be introduced to at least partially fill the vessel and to pressurize the liquid in the vessel; a nozzle including a discharge tube and a nozzle outlet, wherein the nozzle is rotatable with respect to the base assembly, and the nozzle outlet is provided at a distal end of the nozzle via which the liquid may be discharged from the vessel under the pressure of the liquid in the vessel; and a valve between the vessel and the nozzle to control passage of liquid from the vessel to the nozzle outlet; wherein the valve and nozzle discharge tube are substantially in line. A drive system is also disclosed that drives rotation of the nozzle with respect to the base assembly. The drive system may be configured to propel the liquid delivery apparatus along the ground.

19 Claims, 9 Drawing Sheets

(56) References Cited

U.S. PATENT DOCUMENTS

| | | | | |
|---|---|---|---|---|
| 4,204,642 | A | * | 5/1980 | Hunter .................... B05B 1/083 239/747 |
| 4,335,853 | A | * | 6/1982 | Szemeredi ............ B05B 3/0413 239/239 |
| 5,316,215 | A | | 5/1994 | Mitchell |
| 7,048,145 | B2 | | 5/2006 | Mitchell |
| 7,051,952 | B2 | * | 5/2006 | Drechsel ................ A01G 25/09 239/230 |
| 7,408,145 | B2 | | 8/2008 | Holland |
| 2004/0025965 | A1 | * | 2/2004 | Mitchell ................. B05B 12/08 141/198 |

FOREIGN PATENT DOCUMENTS

| | | |
|---|---|---|
| EP | 1296775 A0 | 4/2003 |
| WO | 0202243 A1 | 1/2002 |

OTHER PUBLICATIONS

Extended European Search Report, Application No. EP13162443.9, dated Oct. 15, 2013.

* cited by examiner

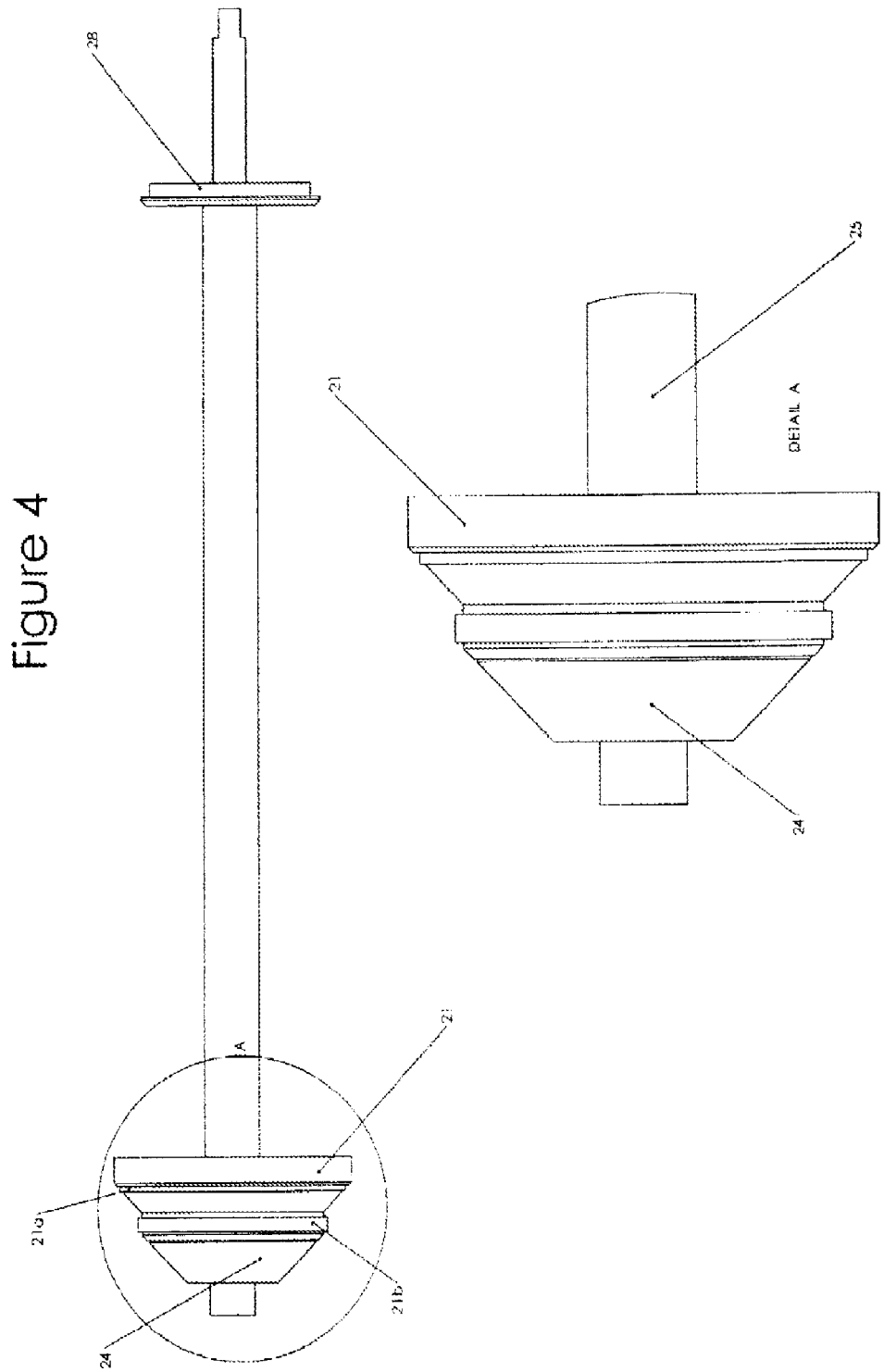

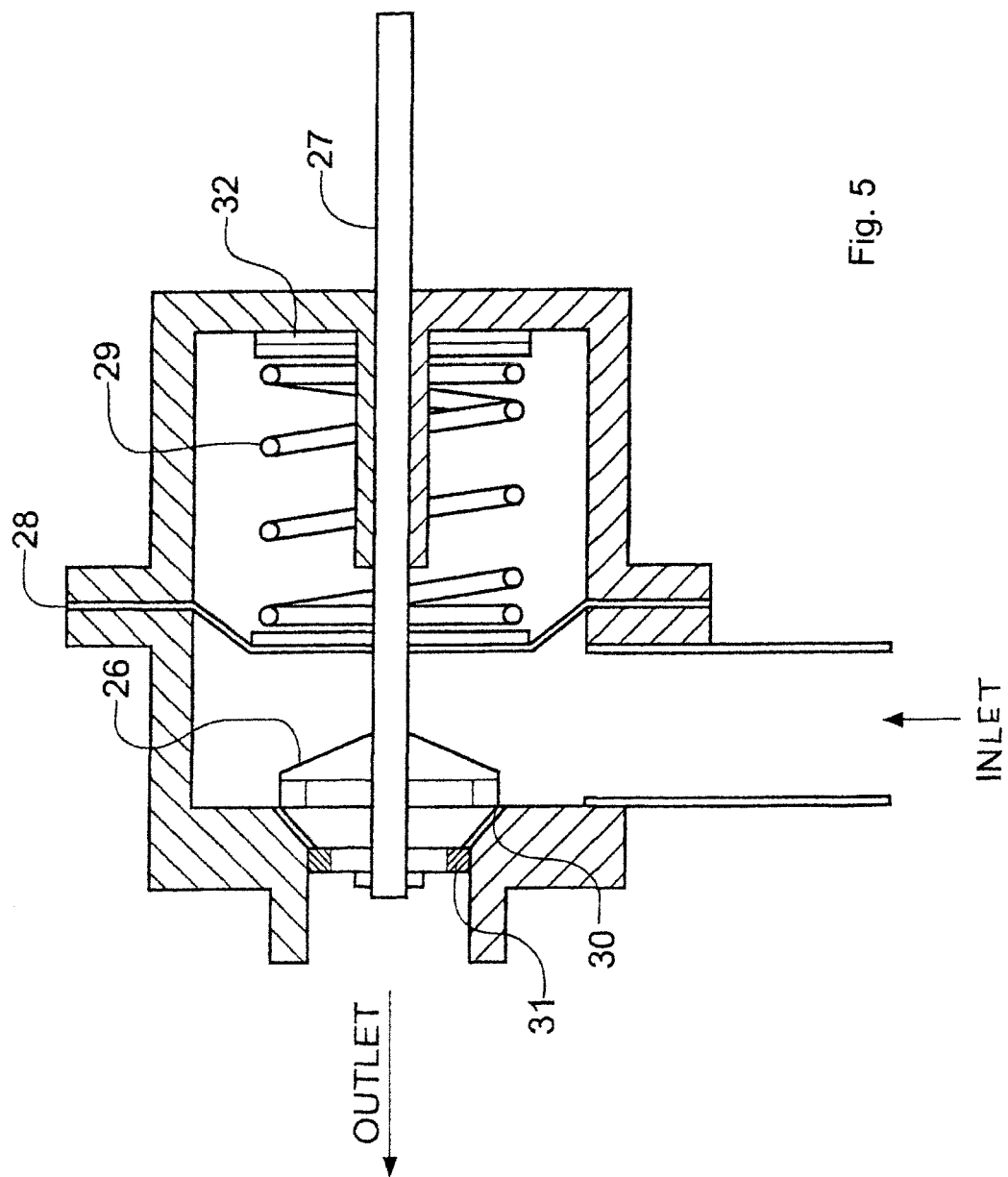

LIQUID DELIVERY APPARATUS

BACKGROUND OF THE INVENTION

The present invention relates to a liquid delivery apparatus, such as a liquid delivery apparatus that is to be used for distributing liquid waste, such as agricultural slurry, over agricultural land.

In U.S. Pat. No. 7,048,145, there is disclosed a liquid delivery apparatus comprising (i) a vessel into which a liquid may be introduced via an inlet to partially fill the vessel and to pressurize the liquid that partially fills the vessel and the air that fills the remainder of the vessel; (ii) an outlet via which said liquid may be discharged from the vessel under the pressure of the liquid and air in the vessel; (iii) a valve between the vessel and the outlet to control passage of liquid from the vessel to the outlet, said valve having (a) an opening, (b) a closure member adapted to close the opening, and (c) a biasing means, the arrangement of the components of the valve being such that the valve is normally held closed by the biasing means; (iv) a valve control mechanism for controlling the operation of the valve in response to the pressure of the liquid and air in the vessel; and (v) a means for transmitting the pressure of the liquid and air in the vessel to the valve control mechanism; wherein the valve control mechanism comprises a moveable element which is capable of being acted on by the pressure of the liquid and air in the vessel and transmitting a resultant force to the closure member of the valve in a direction to open the valve, and wherein the respective effective surface areas of the moveable element and the closure member and the force of the biasing means are chosen such that the closure member is openable when the pressure of the liquid and air in the vessel reaches a predetermined level.

The liquid delivery apparatus disclosed in the aforesaid patents suffers from undesirable pressure losses in the piping between the vessel and the outlet. These pressure losses result in a reduced reach of the spray and, since the coverage area depends on the square of the spray radius, the coverage is significantly reduced. The present invention seeks to address this and other issues.

SUMMARY OF THE INVENTION

According to one aspect of the present invention, there is provided a liquid delivery apparatus comprising a base assembly; a vessel into which liquid may be introduced via an inlet to at least partially fill the vessel and to pressurize the liquid in the vessel; a nozzle comprising a discharge tube and a nozzle outlet, wherein the nozzle is rotatable with respect to the base assembly, and the nozzle outlet is provided at a distal end of the nozzle via which said liquid may be discharged from the vessel under the pressure of the liquid in the vessel; and a valve between the vessel and the nozzle to control passage of liquid from the vessel to the nozzle outlet.

The valve and nozzle discharge tube may be arranged so that they are substantially in line. The valve may lie on a longitudinal axis of the nozzle discharge tube. The valve may be connected to the nozzle. The valve and nozzle may be rotatable with respect to the base assembly. A rotatable connection may be provided between the valve and the base assembly.

The vessel may be connected to the nozzle. The vessel and nozzle may be rotatable with respect to the base assembly. The vessel may be directly connected to the valve. Alternatively, the vessel may not rotate with respect to the base assembly, e.g. the vessel may be stationary with respect to the base assembly. A rotatable connection may be provided between the vessel and the valve.

The valve may comprise a valve seat and corresponding valve closure, which may selectively engage the valve seat to prevent flow through the valve. The valve seat and valve closure may be in line with the nozzle discharge tube. The valve seat and valve closure may lie on the longitudinal axis of the nozzle discharge tube.

The valve may further comprise a valve shaft. The valve closure may be connected to the valve shaft. The valve shaft may be in line with the nozzle discharge tube. The valve shaft may lie on the longitudinal axis of the nozzle discharge tube.

The valve may further comprise a fairing or shroud disposed on a downstream surface of the valve closure. The faring or shroud may be disposed to prevent or limit flow separation downstream of the valve closure.

The valve may be configured to open in response to the pressure in the vessel, e.g. when the pressure in the vessel reaches a threshold value. The valve may further comprise a pressure surface which may be arranged to selectively open or close the valve, e.g. move the valve closure, by virtue of the pressure of air occupying the remainder of the vessel. The air may act on the pressure surface. Alternatively or additionally, the valve may further comprise a pressure surface, which may be arranged to selectively open or close the valve, e.g. move the valve closure, by virtue of the pressure of the liquid in the vessel acting on the pressure surface.

The liquid delivery apparatus may further comprise an air pump for pumping air into the vessel. The air pump may be operatively connected to the nozzle discharge tube such that the flow of liquid through the nozzle discharge tube may drive the air pump. The air pump may comprise a moveable member dividing first and second chambers of the air pump. The first chamber may be in fluidic communication with the nozzle discharge tube. The second chamber may be in fluidic communication with the vessel. The flow of liquid through the nozzle discharge tube may move the moveable member in a first direction. An at least partial vacuum created behind the flow of liquid may move the moveable member in a second direction. The movement of the moveable member may thereby generate a pumping effect in the second chamber.

The liquid delivery apparatus may further comprise a nozzle guard disposed at the distal end of the nozzle. The nozzle guard may extend substantially in the same direction as the liquid that is ejected from the nozzle outlet.

The base assembly may comprise one or more skids arranged to support the liquid delivery apparatus on the ground. The base assembly may alternatively or additionally comprise one or more wheels for moving the liquid delivery apparatus along the ground.

The liquid delivery apparatus may further comprise an inlet assembly arranged to receive liquid into the vessel. The inlet assembly may comprise a connecting portion connectable to a supply pipe. The connecting portion may be rotatable with respect to the remainder of the inlet assembly. The connecting portion may be rotatable about one or more axes, e.g. a vertical axis.

The liquid delivery apparatus may further comprise a wireless communication means for communicating data to or from a base station or other liquid delivery apparatuses. The wireless communication means may comprise a radio link, mobile phone link or any other wireless communication means, which communicates over the electro-magnetic spectrum.

The wireless communication means may communicate data relating to one or more of inlet liquid pressure, outlet liquid pressure, air pressure, nozzle rotational position, valve position, location of the liquid delivery apparatus and stop or start signals. The valve position data may comprise data relating to the position of the valve shaft and/or valve closure. The location of the liquid delivery apparatus may be provided by a GPS device mounted to the liquid delivery apparatus.

According to another aspect of the present invention, there is provided a drive system for a liquid delivery apparatus, the liquid delivery apparatus comprising a base assembly and a nozzle, the nozzle being rotatable with respect to the base assembly, wherein the drive system is configured to drive rotation of the nozzle with respect to the base assembly.

The drive system may be configured to propel the liquid delivery apparatus along the ground.

The drive system may comprise a ratchet assembly comprising a ratchet gear coupled to the rotatable nozzle and a ratchet linkage. The ratchet linkage may be arranged to drive rotation of the ratchet gear, e.g. by virtue of a ratcheting action. The ratchet gear may comprise a prime number of teeth. The ratchet linkage may be configured to ride over two or more teeth at a time. The ratchet linkage may be driven by virtue of a pressure change in the liquid at an inlet to the liquid delivery apparatus.

Movement of the ratchet linkage may be resisted by an air spring. The air spring may be in fluidic communication with a reservoir. The wireless communication means may communicate data relating to the drive system liquid pressure, reservoir pressure, ratchet gear position and/or ratchet linkage position.

The aforementioned liquid delivery apparatus may comprise the aforementioned drive system.

Various aspects of this invention will become apparent to those skilled in the art from the following detailed description of the preferred embodiment, when read in light of the accompanying drawings.

BRIEF DESCRIPTION OF THE DRAWINGS

FIG. 4 shows the valve closure according to the present invention.

FIG. 5 shows an alternative arrangement for the valve according to the present invention.

DETAILED DESCRIPTION OF THE PREFERRED EMBODIMENT

Figure 1:
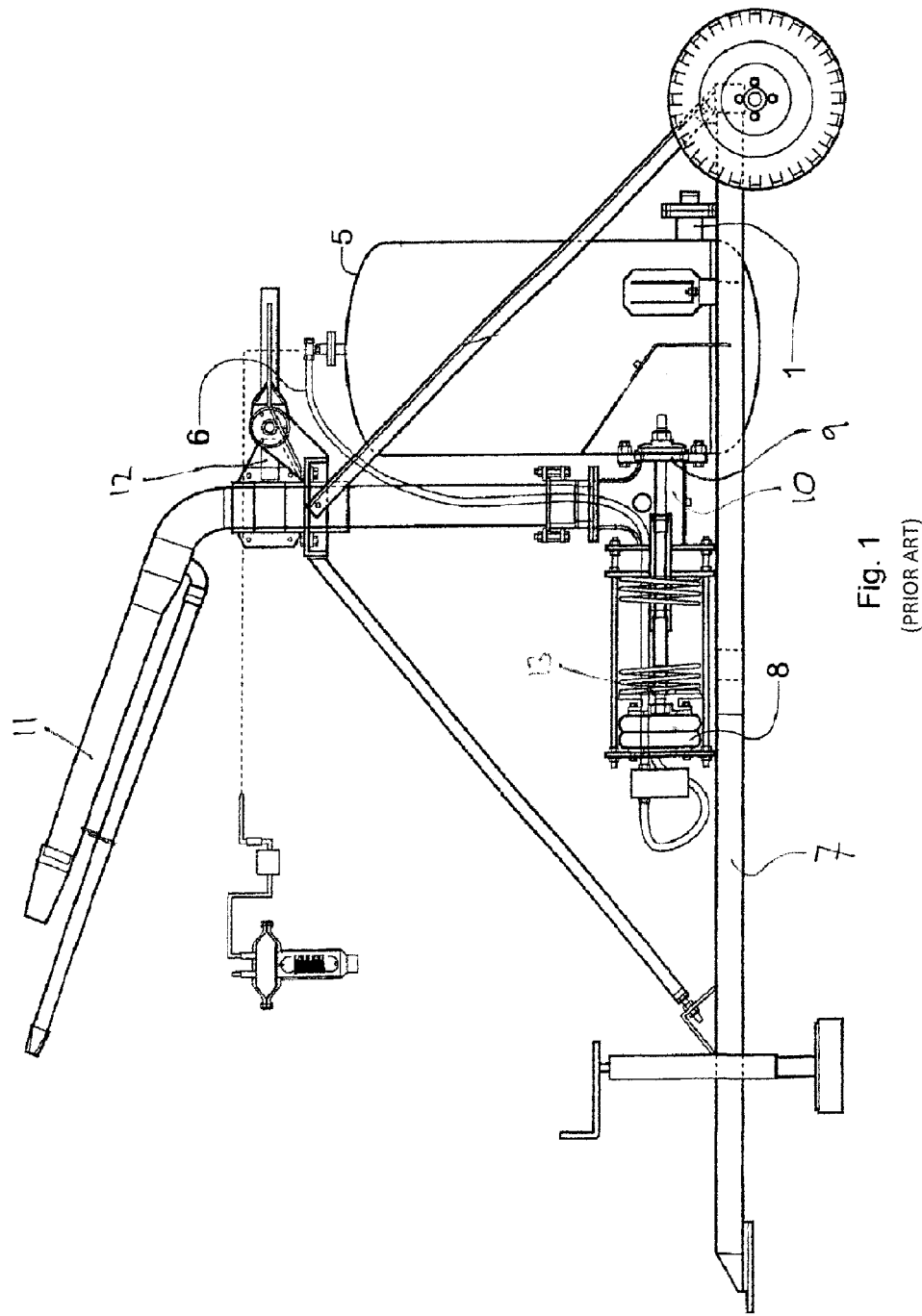
FIG. 1 is a view of a liquid delivery apparatus as already in use and in accordance with European Patent No. 1296775.

Referring to FIG. 1, there is shown an existing liquid delivery apparatus, as more fully disclosed in European Patent No. 1296775. Liquid under pressure is fed via an inlet 1 to a cylindrical pressure vessel 5. The increasing volume of liquid within the vessel 5 compresses the air in the remainder of the vessel. The top of the vessel is connected via an air line 6 to a chamber 8 containing an actuating member, i.e. a diaphragm, of a poppet valve 9. Thus, the introduction of liquid under pressure into the vessel 5 causes an increase in pressure in the chamber 8 until, at a given pressure, as more fully disclosed in the above patent, the poppet valve 9 opens for a brief period of time to allow liquid under pressure to enter a chamber 10 and from there to be discharged from a nozzle 11. In this fashion, liquids, such as agricultural slurries, may be sprayed into the air and subsequently absorbed in the ground below.

The release of the pressure in the vessel 5 and in the chamber 8, as a result of the opening of the poppet valve 9, allows the poppet valve to close again, by the action of a compression spring 13. This cycle is then repeated upon the introduction of more liquid under pressure through the inlet 1.

The nozzle 11 is rotatable with respect to a base assembly 7 of the liquid delivery apparatus and a mechanism 12 for rotating the nozzle 11 is provided. As is explained in the above patent, the mechanism 12 is configured to cause stepwise rotation of the nozzle 11. The liquid sprayed from the nozzle 11 may thus cover an area surrounding the liquid delivery apparatus. A diaphragm or bellows unit is in communication with chamber 10 to provide a reciprocating movement to the mechanism 12.

Figure 2:
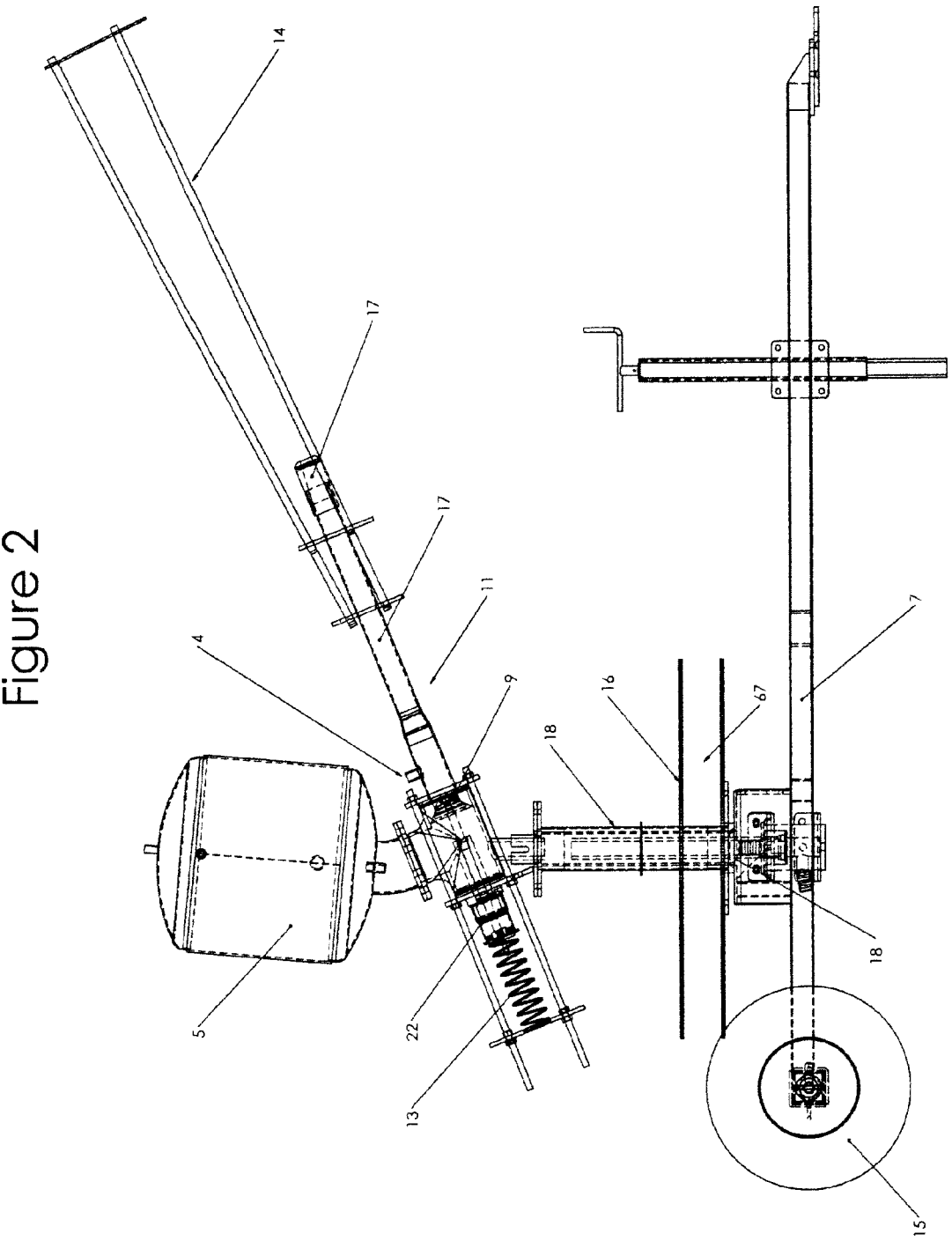
FIG. 2 shows various improvements, in accordance with the present invention, in the apparatus shown in FIG. 1.

FIG. 2 shows a modification of the apparatus of FIG. 1. In this modification, in accordance with the present invention, the valve 9 and vessel 5, in addition to the nozzle 11, are rotatable with respect to the remainder of the liquid delivery apparatus. The valve 9 and a discharge tube 17 of the nozzle 11 are arranged so that they are substantially in line. In other words, the valve 9 may lie on a longitudinal axis of the nozzle discharge tube 17.

As depicted, the nozzle 11 is directly connected to the valve 9, e.g. via flange connections, although the nozzle and valve may be unitary. The vessel 5 is also directly connected to the valve 9. The valve 9, vessel 5 and nozzle are thus connected together and are together rotatable with respect to the base assembly 7. The axis of rotation may be substantially vertical, although it may be adjusted, e.g. to suit the local terrain. The vessel 5 may be positioned with the vessel's centre of gravity substantially in line with the axis of rotation so as to reduce the moment of inertia and to improve the rotational balance of the liquid delivery apparatus. However, the vessel's centre of gravity may be offset from the axis of rotation to balance the otherwise unbalanced nozzle and valve.

A supporting member 18 connects the valve 9 to the base assembly 7. The supporting member 18 is rotatable with respect to the base assembly 7 by virtue of a rotatable connection 18' at the bottom of the supporting member. The supporting member 18 thus supports the nozzle 11, valve 9 and vessel 5 with respect to the base assembly 7 and permits relative rotation therebetween. In contrast to the arrangement shown in FIG. 1, the rotatable connection 18' of the present invention is not provided between the valve 9 and the nozzle 11. The rotatable connection 18' of the present invention is instead provided between the base assembly 7 and the supporting member 18. The supporting member 18 may also comprise a flow passage which is adapted to transmit liquid from an inlet (shown in FIG. 7) to the valve 9 and vessel 5. The supporting member flow passage and vessel 5 are connected to the same side of valve 9 so that the vessel 5 and inlet are in fluidic communication regardless of the position of the valve.

In an alternative arrangement (not shown), the vessel 5 may not rotate with respect to the base assembly 8. For example, the vessel 5 may be stationary with respect to the base assembly and a rotatable connection may be provided between the vessel 5 and the valve 9. The rotatable connection may permit fluid from the vessel 5 to flow to the valve 9, whilst permitting the valve and nozzle assembly to rotate with respect to the base assembly. Such an arrangement may be advantageous because it would allow the vessel to be placed beneath the valve and nozzle assembly, thereby lowering the centre of gravity and increasing the stability of the liquid delivery apparatus. Furthermore, the moment of inertia of the rotatable valve and nozzle assembly would be reduced, thereby reducing the moment required to rotate the valve and nozzle assembly.

By providing the valve 9 in close proximity to and/or in line with the nozzle 11, the pressure losses between the valve and a nozzle outlet 17' may be reduced. A spray with a greater reach may thus be provided.

The liquid delivery apparatus further comprises a nozzle guard 14 disposed at a distal end of the nozzle 11, i.e. at the outlet end 17' of the nozzle. The nozzle guard 14 is attached to the nozzle delivery tube 17 and comprises one or more substantially longitudinally disposed members. The nozzle guard 14 may extend substantially in the same direction as the liquid that is ejected from the nozzle outlet 17'. As a result, the nozzle guard 14 may at least initially extend substantially in the same direction as the longitudinal axis of the nozzle delivery tube 17. The nozzle guard 14 may be configured to at least partially surround the ejected spray. The nozzle guard 14 may expand in diameter away from the nozzle 11 to account for the widening spray diameter and/or the effect of gravity on the spray trajectory. Advantageously, the nozzle guard 14 may serve to avoid injuring a passing animal or human that might otherwise get too close to the pressurized spray exiting the nozzle 11. The nozzle guard 14 effectively increases the height of the nozzle outlet without inducing further pressure losses (e.g. by having a longer nozzle). An otherwise larger increase in the weight of the liquid delivery apparatus or moment of inertia of the rotatable portion is also avoided. The nozzle guard also effectively allows the nozzle 11 to be mounted lower, thereby increasing stability and reducing material costs.

As is also shown in FIG. 2, the base assembly comprises one or more wheels 15 for moving the liquid delivery apparatus along the ground. Although not shown, the base assembly may alternatively or additionally comprise one or more skids arranged to support the liquid delivery apparatus on the ground. The skids may provide a firmer platform from which liquid can be fired from the nozzle 11.

The liquid delivery apparatus further comprises a drive system 16. The drive system may be configured to drive rotation of the nozzle 11 with respect to the base assembly 7 and/or propel the liquid delivery apparatus along the ground. The drive system will be described in more detail below with reference to FIG. 8.

Figure 6:
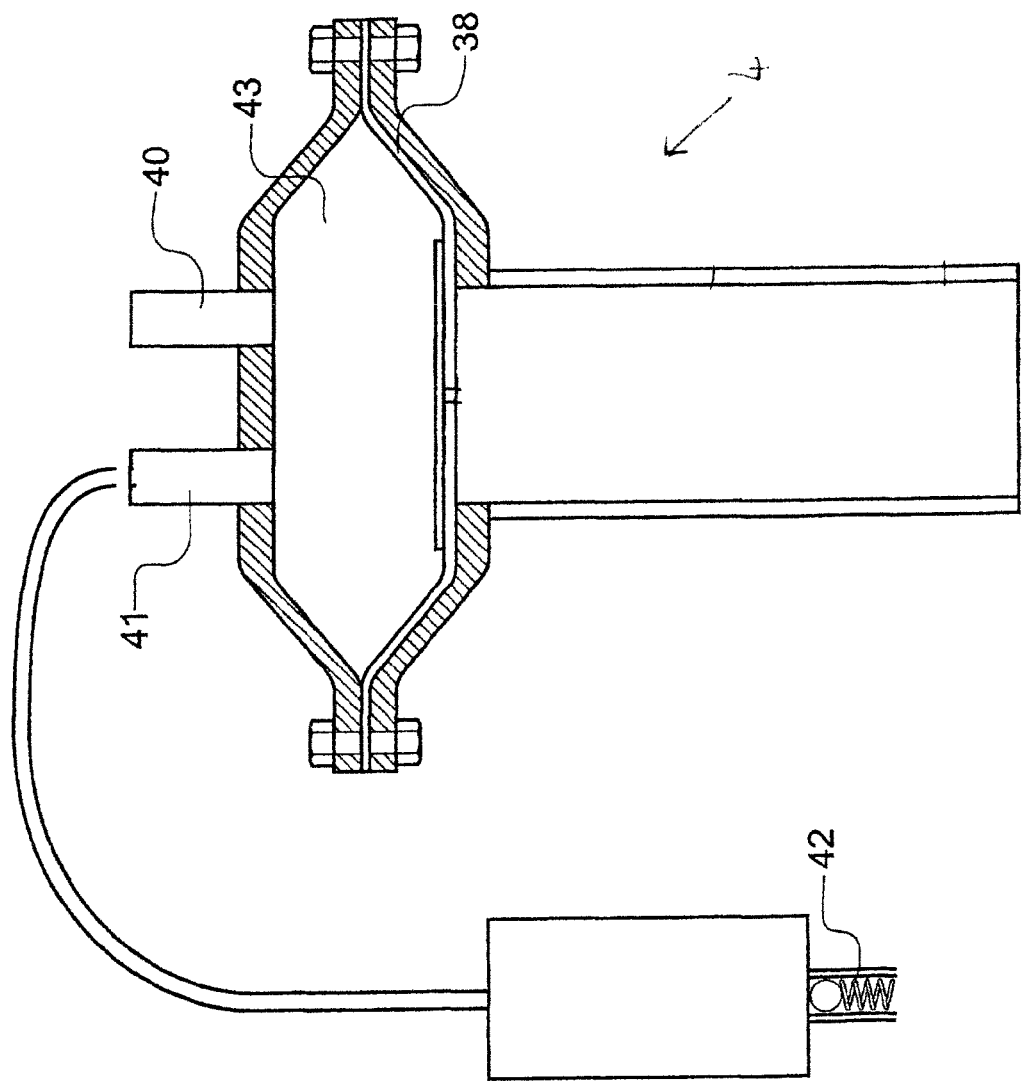
FIG. 6 shows a pump for use with the present invention.

As described in more detail below with reference to FIG. 6, an air pump 4 may be provided on a side wall of the nozzle discharge tube 17. The air pump 4 may provide air to the vessel 5.

Referring to FIGS. 3 and 4, further details of the valve 9 will be described. As shown, the valve 9 may comprise a valve seat 20 and corresponding valve closure 21, which may selectively engage the valve seat to prevent flow through the valve. As depicted, the valve seat 20 and valve closure 21 may be in line with the nozzle discharge tube. Accordingly, the valve seat 20 and valve closure 21 may lie on the longitudinal axis of the nozzle discharge tube 17. The valve 9 may further comprise a valve shaft 25. The valve closure 21 may be connected to a first end of the valve shaft 25. The valve shaft 25 may be in line with the nozzle discharge tube. The valve shaft 25 may lie on the longitudinal axis of the nozzle discharge tube 17.

FIG. 3 shows on an enlarged scale the mechanism, in the form of a bellows 22, for actuating the valve 9. As shown in FIG. 3, the bellows 22 and the compression spring 13 are held between plates 23a and 23b which in turn are mounted on threaded bars and held by nuts. The bellows 22 are in fluidic communication with the air in the vessel 5 by virtue of an airline (not shown). The airline may connect at or towards the top of vessel 5 (in a manner similar to that shown in FIG. 1). A further plate 23c is provided between the bellows 22 and the spring 13. The further plate 23c is connected to a second end of the valve shaft 25 and the bellows 22 are provided around a portion of the valve shaft at the second end of the valve shaft. The further plate 23c and hence valve shaft 25 are movable by the expansion and contraction of the bellows 22. The bellows may comprise a rolling type bellows.

As the pressure in the bellows increases, the bellows expands against the spring 13 and the valve shaft 25 moves by virtue of the further plate 23c provided between the spring 13 and bellows 22. The valve closure 21, which is connected to the valve shaft 25, therefore moves away from the valve seat, thereby opening the valve (as shown in FIG. 3b). The bellows 22 acting on the further plate 23c effectively provides a pressure surface on which the pressure of the air in the vessel may act. The pressure surface may thus provide a force to move the valve closure 21 by virtue of the pressure in the vessel 5.

Figure 3A:
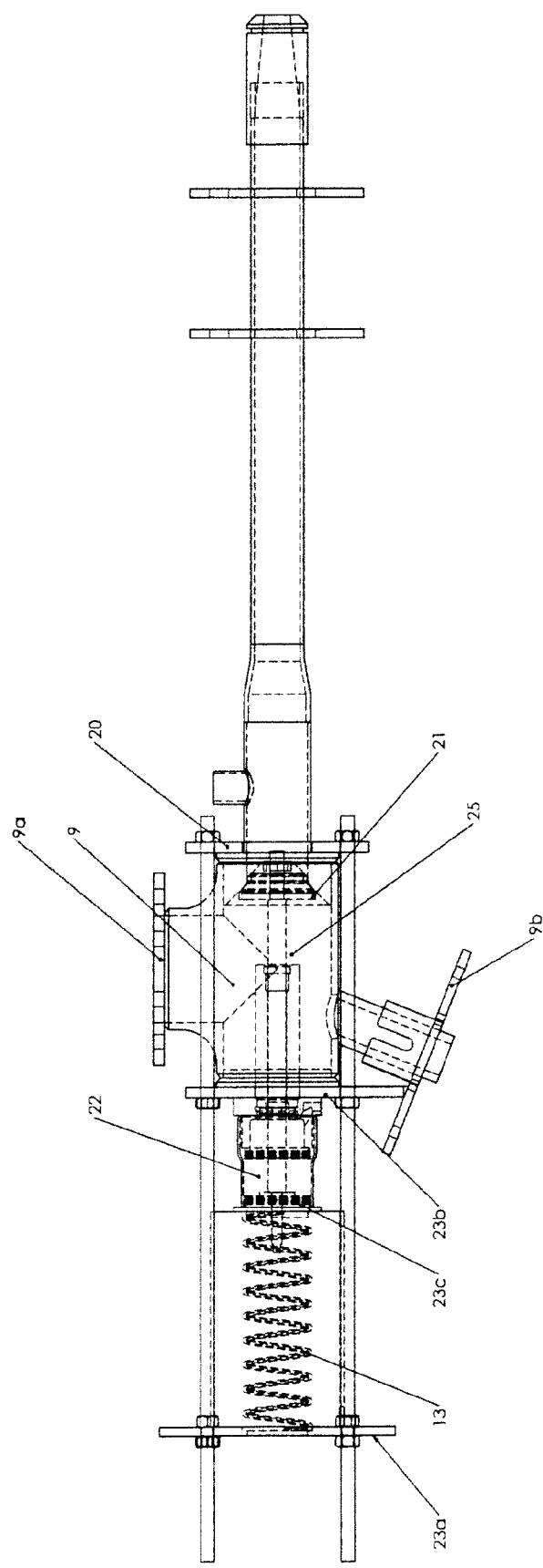
FIG. 3 shows further details of the valve and nozzle according to the present invention with FIG. 3a showing the valve in a closed position and FIG. 3b showing the valve in an open position.
Figure 3B:
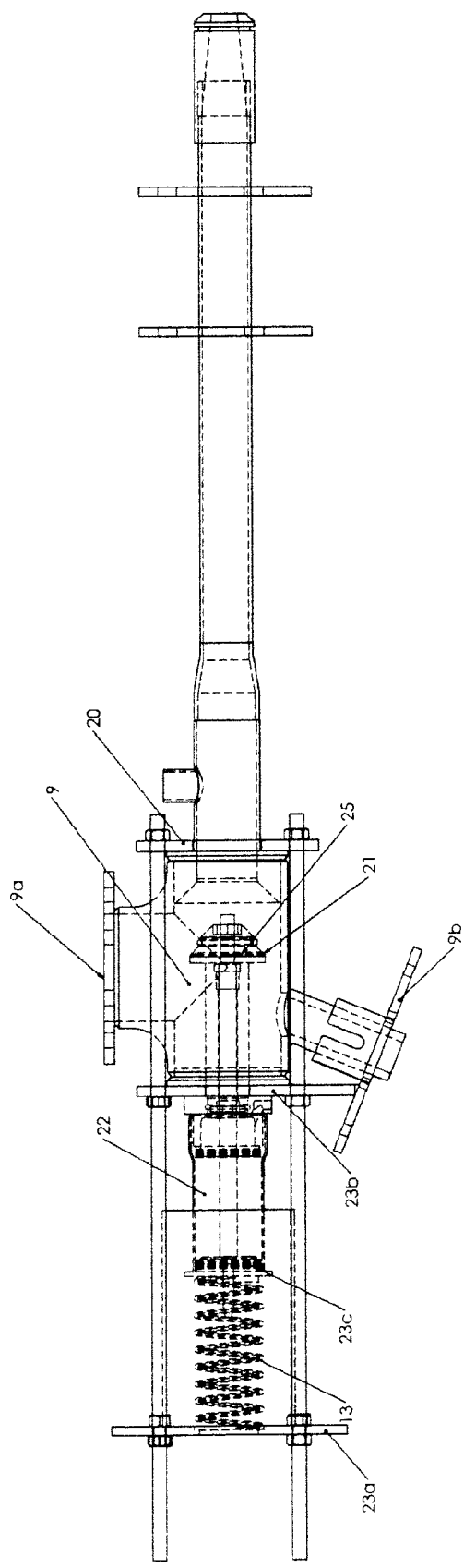

The release of the pressure in the vessel 5, as a result of the opening of the valve 9, allows the valve to close again (as shown in FIG. 3a), by the action of the spring 13. This cycle is then repeated upon the introduction of more liquid under pressure into the vessel 5.

By changing the distance between plates 23a and 23b, it is possible to change the opening and closing pressure of valve 9, i.e. the higher the pressure on the spring 13 the higher are the opening and closing pressure of valve 9.

As depicted in FIG. 3, the valve 9 comprises a chamber 9', which is provided between, and is in fluidic communication with, the vessel 5 and the valve seat and closure 20, 21. The flow passage in the supporting member 18 may also be in fluidic communication with the valve chamber 9'. The valve 9 may comprise one or more flanges 9a, 9b for connecting to the vessel 5 and supporting member 18.

The valve shaft 25 extends through the valve chamber 9'. The valve seat and closure 20, 21 are provided at one end of the valve chamber 9'. The bellows 22 and spring 13 are provided at an opposite end of the chamber 9' and are provided outside of the chamber 9'. The bellows 22 are provided between the spring 13 and the chamber 9'. The valve 9 is configured such that the valve closure 21 moves into the valve chamber 9' when the valve opens (by virtue of the movement of the bellows 22 and valve shaft 25). Accordingly, the valve closure 21 is moved in an the upstream direction, e.g. away from the nozzle 11, when the valve 9 opens. The valve closure 21 may therefore move out of the way of the main flow from the vessel 5 to the nozzle 11 and therefore reduces any pressure losses in the valve. Furthermore, the valve shaft 25 is not in the flow path through the valve seat 20 and therefore does not reduce the flow area through the valve 9 when the valve is open. (Alternatively, the position of the bellows 22 and spring 13 could be swapped and the valve closure may open in a downstream direction, e.g. towards the nozzle 11.)

As shown in FIG. 4, the valve 9 may further comprise a fairing or shroud 24 disposed on a downstream surface of the valve closure 21. The faring or shroud 24 may improve the flow around the valve closure 21, in particular the fairing or shroud may be streamlined to prevent or limit flow separation downstream of the valve closure, which would otherwise serve to increase pressure losses.

The valve closure 21 may also comprise first and second seals 21a, 21b with the second seal 21b being provided at a position on the valve closure with a smaller cross-sectional area than that at the position of the first seal 21*a*. The valve seat 20 may be configured so that upon opening of the valve the second seal 21*b* loses contact with the valve seat 20 after the first seal 21*a* loses contact with the valve seat 20. Due to the different cross-sectional areas of the valve closure at the first and second seal positions, the valve effectively has two threshold pressures at which the valve will open. The first threshold pressure is defined by the first seal 21*a* and the second threshold pressure is defined by the second seal 21*b*. As the area of the valve closure at the second seal 21*b* is smaller than that at the first seal 21*a*, the second threshold pressure is smaller than the first threshold pressure. Thus, once the pressure in the bellows 22 exceeds the larger first threshold pressure, the pressure is more than sufficient to overcome the second threshold pressure, which is required to fully open the valve, and the valve therefore opens more quickly and cleanly and has a reduced tendency to shudder.

FIG. 5 depicts an alternative arrangement for valve 9. The aforementioned valve uses the pressure of the air in the vessel to activate the valve, however, in an alternative arrangement the valve may be activated by the pressure of the liquid. Liquid from the vessel may simply be provided to the bellows of the valve shown in FIGS. 2 and 3. Alternatively, the valve may be as depicted in FIG. 5. This valve has a valve closure 26 mounted on a shaft 27 that is moveable by the actuation of a bellows or diaphragm 28 against the action of a compression spring 29. The valve closure, like that of FIGS. 3 and 4, has a two stage opening area, i.e. a first seal 30 and a second seal 31, the first seal 30 being of larger diameter than the second seal 31 and the first seal 30 opening before the second seal 31 (as already described with reference to FIG. 4). This again reduces the tendency of the valve to shudder. The valve of FIG. 5 is driven by the pressure of the liquid under pressure that enters the inlet of the valve, e.g. directly from the vessel. This (increasing) pressure acts on the diaphragm 28 until the pressure is sufficient to overcome the force exerted on the diaphragm by the spring 29 and on the valve closure 26 by the liquid. The valve then opens until the pressure falls to allow the diaphragm 28 and the valve closure 26 to return to their original positions.

Some liquids, for example agricultural slurries, absorb oxygen. Therefore, to maintain the pressure in the vessel 5 when using such liquids, it may be necessary to pump air into the vessel 5 to replace the oxygen absorbed by the liquid. Accordingly, FIG. 6 shows an optional pump 4 for pumping air into the pressure vessel 5, which consists of a moveable member, e.g. diaphragm 38. The pump further comprises an inlet valve 40, an outlet valve 41, and a non-return valve 42. The diaphragm 38 separates the pump into first and second chambers 44 and 43. The first chamber 44 is in fluidic communication with the nozzle discharge tube 17, whilst the second chamber 43 is in communication with the vessel 5.

The pump 4 is operatively connected to the nozzle discharge tube 17 such that the flow of liquid through the nozzle discharge tube may drive the pump. The pressure created by the flow of liquid through the nozzle discharge tube may move the diaphragm 38 in a first direction, which tends to expand the volume of the first chamber 44. By contrast, the suction behind the flow of liquid through the nozzle discharge tube 17 may move the diaphragm in a second direction, which tends to contract the volume of the first chamber 44. The movement of the diaphragm 38 may thereby generate a pumping effect in the second chamber 43. The pumping effect draws air in through the inlet valve 40 and into the vessel 5 via the outlet valve 41 and non-return valve 42. By having the first chamber 44 of the pump in communication with the nozzle discharge tube 17, a return spring acting on the diaphragm may be omitted thanks to the suction created behind the flow of liquid through the nozzle discharge tube 17.

Figure 7:
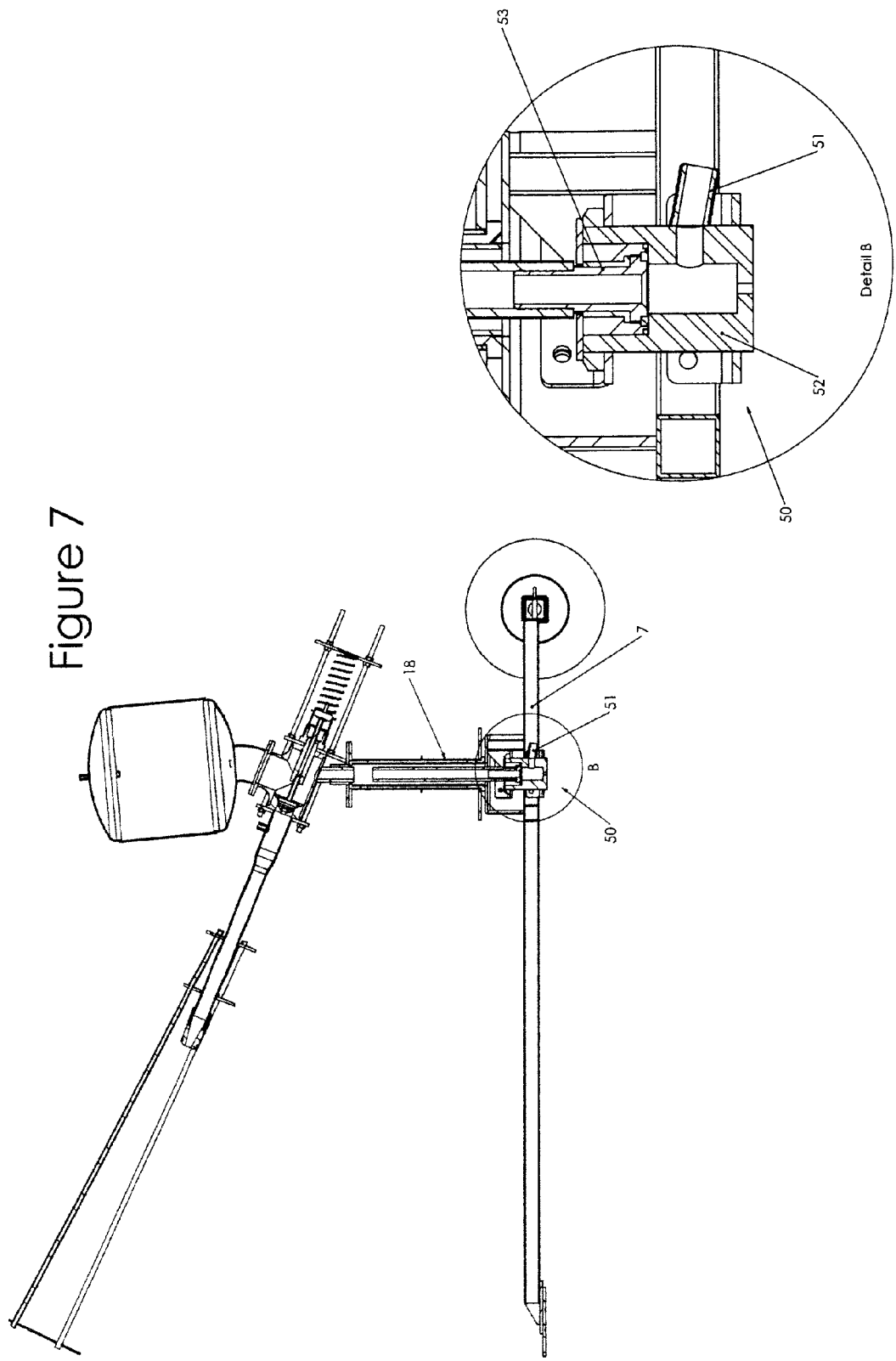
FIG. 7 shows an inlet assembly arranged to receive liquid into the vessel according to the present invention.

Referring to FIG. 7, the liquid delivery apparatus may further comprise an inlet assembly 50 arranged to receive liquid into the vessel 5. The inlet assembly 50 may comprise a connecting portion, e.g. inlet 51, which is connectable to a supply pipe (not shown). The inlet 51 may be connected to a rotatable boss 52, which has a flow passage for receiving liquid from the supply pipe. The inlet assembly 50 also comprises a pipe portion 53, which has a flow passage arranged to transfer liquid from the rotatable boss 52 to the supporting member 18 and then to the vessel 5.

A rotating sliding interface is provided between the boss 52 and pipe portion 53. One or more seals may be provided between the rotatable boss 52 and pipe portion 53. As a result, the inlet 51 may be rotatable with respect to the remainder of the inlet assembly and thus also the base assembly 7. The rotatable inlet 51 may prevent or limit any strain on the supply pipe when the liquid delivery apparatus is turned.

Figure 8:
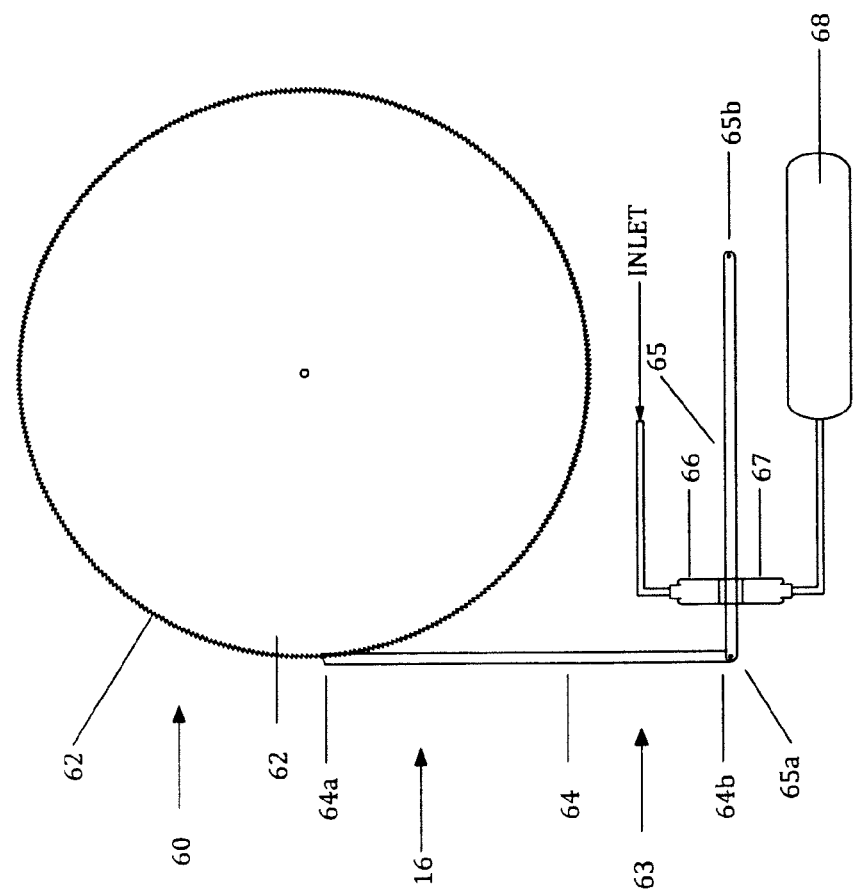
FIG. 8 shows a drive system for a liquid delivery apparatus according to the present invention.

With reference to FIG. 8, a drive system 16 for a liquid delivery apparatus according to the present invention is shown. The drive system 16 is arranged to rotate the nozzle 11 with respect to the base assembly 7. The drive system 16 may also be arranged to propel the liquid delivery apparatus along the ground.

As depicted, the drive system 16 comprises a ratchet assembly 60 which in turn comprises a ratchet gear 62 and a ratchet linkage 63. The ratchet gear 62 is rotatably coupled to the rotatable nozzle 11 via the supporting member 18 on which the nozzle 11, valve 9 and vessel 5 are supported. The supporting member 18 is rotatable with respect to the base assembly 7. The ratchet gear 62 may be connected, e.g. directly connected, to the supporting member so that rotation of the ratchet gear 62 causes the supporting member 18 and thus the nozzle 11 to rotate. In an alternative arrangement, the ratchet gear 62 may be rotatably coupled to the supporting member 18 via a further gear connected to the supporting member 18. An intermediate gear, e.g. a pinion gear, may optionally be provided between the ratchet gear and the further gear on the supporting member. With either arrangement a gear ratio may be provided between the ratchet gear 62 and the supporting member 18. The gear ratio may reduce or increase the angle through which the nozzle turns with each ratchet of the ratchet gear and thereby reduce or increase the torque required respectively.

The ratchet linkage 63 comprises first and second levers 64, 65. A first end 64*a* of the first lever 64 engages teeth 62' of the ratchet gear 62. A second end 64*b* of the first lever 64 is pivotally connected to a first end 65*a* of the second lever 65. The first lever 64 may be biased towards the ratchet gear 62, e.g. by a spring (not shown). A second end 65*b* of the second lever 65 is pivotally connected to a fixed portion (not shown) which is in turn connected to the base assembly 7. The levers 64, 65 are arranged such that movement of the second lever 65 in a first direction causes the first end 64*a* of the first lever 64 to ride over one or more of the ratchet gear teeth 62'. By contrast, movement of the second lever 65 in a second direction causes the first end 64*a* of the first lever 64 to engage the ratchet gear teeth 62', thereby resulting in rotation of the ratchet gear 62. In this way a reciprocating motion of the second lever 65 results in the stepwise rotation of the nozzle 11. The liquid sprayed from the nozzle 11 may thus cover an area surrounding the liquid delivery apparatus.

The reciprocating motion of the second lever 65 may be driven by a pressure change in the liquid, for example the pressure of the liquid at the inlet to the liquid delivery apparatus. In this respect, a diaphragm or bellows unit 66 may be connected to the second lever 65. The bellows unit 66 may be arranged such that pressurized liquid in the bellows causes the second lever to move in the first direction. The bellows unit 66 may be supplied with liquid upstream of the vessel 5, e.g. from the slurry input feed. The pressure of the liquid in the vessel 5 and thus also upstream of the vessel will vary as the valve 9 successively discharges liquid through the nozzle 11. This pressure variation may drive the successive movement of the second lever 65 and in turn the ratchet gear 62 and nozzle 11. The second lever 65 may be moved in the second direction by virtue of a resilient means, e.g. in the form of a fluid spring. The fluid spring may comprise a further diaphragm or bellows unit 67 which may be in fluidic communication with a reservoir 68. The bellows unit 67 and reservoir 68 may be filled with air. The reservoir 68 may have a volume between 50 and 100 liters. The air pressure in the reservoir 68 may be set to return the second lever 65 when the pressure at the first bellows unit 66 is low, e.g. after the vessel has discharged liquid through the nozzle. The bellows units 66, 67 may comprise rolling type bellows.

The first lever 64 may also be configured to ride over two or more teeth 62' of the ratchet gear 62 with each movement of the ratchet linkage. In this way, the drive system may ensure that successive sprays from the nozzle 11 are sufficiently circumferentially separated that the ground beneath is not over saturated. The ratchet gear 62 may comprise a prime number of teeth 62'. By having a prime number of ratchet gear teeth, the circumferential gaps caused by the first lever 64 riding over two or more of the ratchet gear teeth at a time will be filled in after subsequent rotations of the ratchet gear 62.

In addition to the ratchet gear 62, the drive system 16 may further comprise a spool 67 (as shown in FIG. 2). The spool 67 is operatively connected to the ratchet gear 62 such that the spool rotates with the ratchet gear. The spool 67 is adapted to receive a flexible member such as a pipe, rope, cable or any other flexible member capable of being held under tension. The flexible member may be fixed at one end, e.g. at an end of an agricultural field, and the spool 67 may wind the flexible member onto the spool by virtue of the rotation of the ratchet gear 62, thereby propelling the liquid delivery apparatus along the ground. In the case of the flexible member being a pipe, the same pipe may also supply liquid to the inlet of the liquid delivery apparatus.

Although not depicted, the liquid delivery apparatus may further comprise a wireless communication means for communicating data to or from a base station or other liquid delivery apparatuses. The wireless communication means may comprise a radio link, mobile phone link or any other wireless communication means, which communicates over the electro-magnetic spectrum.

The wireless communication means may communicate data relating to one or more of inlet liquid pressure, outlet liquid pressure, air pressure, nozzle rotational position, valve position, location of the liquid delivery apparatus and stop or start signals. The valve position data may comprise data relating to the position of the valve shaft and/or valve closure. The location of the liquid delivery apparatus may be provided by a GPS device mounted to the liquid delivery apparatus.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A liquid delivery apparatus comprising:
    a base assembly;
    a vessel into which liquid may be introduced via an inlet to at least partially fill the vessel and to pressurize the liquid in the vessel;
    a nozzle comprising a discharge tube and a nozzle outlet, wherein the nozzle is rotatable with respect to the base assembly, and the nozzle outlet is provided at a distal end of the nozzle via which said liquid may be discharged from the vessel under the pressure of the liquid in the vessel;
    a valve between the vessel and the nozzle to control passage of liquid from the vessel to the nozzle outlet, the valve being configured to open in response to the pressure in the vessel; and
    a drive system configured to drive rotation of the nozzle with respect to the base assembly, the drive system including a ratchet assembly having a ratchet gear coupled to the rotatable nozzle and a ratchet linkage, the ratchet linkage being arranged to drive rotation of the ratchet gear, wherein the ratchet linkage is driven by virtue of a pressure change in the liquid at the inlet to the liquid delivery apparatus.

2. The liquid delivery apparatus of claim 1, wherein the valve is connected to the nozzle such that the valve and nozzle are rotatable with respect to the base assembly.

3. The liquid delivery apparatus of claim 1, wherein the vessel is connected to the nozzle such that the vessel and nozzle are rotatable with respect to the base assembly.

4. The liquid delivery apparatus of claim 1, wherein the vessel is directly connected to the valve.

5. The liquid delivery apparatus of claim 1, wherein the valve comprises a valve seat and corresponding valve closure which may selectively engage the valve seat to prevent flow through the valve.

6. The liquid delivery apparatus of claim 5, wherein the valve seat and valve closure are in line with the nozzle discharge tube.

7. The liquid delivery apparatus of claim 5, wherein the valve further comprises a valve shaft, the valve closure being connected to the valve shaft, and wherein the valve shaft is in line with the nozzle discharge tube.

8. The liquid delivery apparatus of claim 5, wherein the valve further comprises a fairing disposed on a downstream surface of the valve closure, the fairing being disposed to prevent or limit flow separation downstream of the valve closure.

9. The liquid delivery apparatus of claim 1, wherein the valve further comprises a pressure surface arranged to selectively open or close the valve by virtue of the pressure of air occupying the remainder of the vessel acting on the pressure surface.

10. The liquid delivery apparatus of claim 1, wherein the valve further comprises a pressure surface arranged to selectively open or close the valve by virtue of the pressure of the liquid in the vessel acting on the pressure surface.

11. The liquid delivery apparatus of claim 1, wherein the liquid delivery apparatus further comprises an air pump for pumping air into the vessel, the air pump being operatively connected to the nozzle discharge tube such that the flow of liquid through the nozzle discharge tube drives the air pump.

12. The liquid delivery apparatus of claim 11, wherein the air pump comprises a moveable member dividing first and second chambers of the air pump, the first chamber being in fluidic communication with the nozzle discharge tube such that the flow of liquid through the nozzle discharge tube moves the moveable member in a first direction and an at least partial vacuum created behind the flow of liquid moves the moveable member in a second direction, the movement of the moveable member thereby generating a pumping effect in the second chamber.

13. The liquid delivery apparatus of claim 1, wherein the liquid delivery apparatus further comprises a nozzle guard disposed at the distal end of the nozzle, the nozzle guard extending substantially in the same direction as the liquid that is ejected from the nozzle outlet.

14. The liquid delivery apparatus of claim 1, wherein the liquid delivery apparatus further comprises an inlet assembly arranged to receive liquid into the vessel, the inlet assembly comprising a connecting portion connectable to a supply pipe, the connecting portion being rotatable with respect to the remainder of the inlet assembly.

15. The liquid delivery apparatus of claim 1, wherein the liquid delivery apparatus further comprises a wireless communication means for communicating data to or from a base station or other liquid delivery apparatuses.

16. The liquid delivery apparatus of claim 1, wherein the drive system is configured to propel the liquid delivery apparatus along the ground.

17. The liquid delivery apparatus of claim 1, wherein the ratchet gear comprises a prime number of teeth.

18. The liquid delivery apparatus of claim 1, wherein the drive system further comprises a bellows in fluidic communication with liquid upstream of the vessel, and wherein the bellows is operatively coupled to the ratchet linkage such that pressure variations in the bellows drives movement of the ratchet linkage, which in turn drives rotation of the ratchet gear.

19. The liquid delivery apparatus of claim 1, wherein the valve and nozzle discharge tube are arranged so that they are substantially in line.

* * * * *